United States Patent
Zheng et al.

(10) Patent No.: US 10,597,159 B2
(45) Date of Patent: Mar. 24, 2020

(54) PORTABLE ELECTRONIC DEVICE HOLDER

(71) Applicant: SINGAPORE TECHNOLOGIES AEROSPACE LTD, Singapore (SG)

(72) Inventors: Guo Ying Zheng, Singapore (SG); Ivan Tan, Singapore (SG); Yong Qi Chong, Singapore (SG)

(73) Assignee: ST ENGINEERING AEROSPACE LTD., Paya Lebar (SG)

( * ) Notice: Subject to any disclaimer, the term of this patent is extended or adjusted under 35 U.S.C. 154(b) by 206 days.

(21) Appl. No.: 15/561,942

(22) PCT Filed: Apr. 13, 2015

(86) PCT No.: PCT/SG2015/050069
§ 371 (c)(1),
(2) Date: Sep. 26, 2017

(87) PCT Pub. No.: WO2016/167720
PCT Pub. Date: Oct. 20, 2016

(65) Prior Publication Data
US 2018/0111690 A1    Apr. 26, 2018

(51) Int. Cl.
*B64D 11/00* (2006.01)
*B64D 11/06* (2006.01)
*B60N 3/00* (2006.01)

(52) U.S. Cl.
CPC ........ *B64D 11/00152* (2014.12); *B60N 3/004* (2013.01); *B64D 11/0015* (2013.01); *B64D 11/0638* (2014.12)

(58) Field of Classification Search
CPC .......... B64D 11/00152; B64D 11/0638; B64D 11/0015; B60N 3/004
(Continued)

(56) References Cited

U.S. PATENT DOCUMENTS 2,835,072 A * 5/1958 Gramacy ............... A47B 23/06
                                                         248/453
5,765,799 A * 6/1998 Weber .................. A47B 23/044
                                                         248/453
(Continued)

FOREIGN PATENT DOCUMENTS

CN         1953103 A      4/2007
CN      201638916 U      11/2010
(Continued)

OTHER PUBLICATIONS

Japanese Office Action dated Sep. 25, 2018 regarding Japanese Patent Application No. 2017-553425 corresponding to U.S. Appl. No. 15/561,942 (5 pages) with English Translation (5 pages).
(Continued)

*Primary Examiner* — Milton Nelson, Jr.
(74) *Attorney, Agent, or Firm* — Lewis Roca Rothgerber Christie LLP

(57) ABSTRACT

Various embodiments provide a portable electronic device holder (400, 500, 600, 700, 900, 1100, 1400) for a passenger seat (202), including a longitudinal clamping structure (420, 520) having a generally L-shaped cross-section. The clamping structure includes a supporting flap (422, 522) forming an L-base of the generally L-shaped clamping structure and configured to support a portable electronic device, and a clamping flap (424, 524) forming an L-leg of the generally L-shaped clamping structure and configured to clamp the portable electronic device against a surface (650) abutting the portable electronic device. The portable electronic device holder further includes a mounting element (410, 510) for slidably or titlably mounting the clamping structure to the passenger seat.

16 Claims, 11 Drawing Sheets

(58) Field of Classification Search
USPC .................. 297/188.05, 188.04; 248/453
See application file for complete search history.

(56) References Cited

U.S. PATENT DOCUMENTS

| | | | |
|---|---|---|---|
| 8,567,740 B2* | 10/2013 | Tarnutzer | B42D 9/00 |
| | | | 248/454 |
| 8,851,565 B2 | 10/2014 | Hontz et al. | |
| 9,457,905 B2* | 10/2016 | Felske | B64D 11/0627 |
| 9,511,862 B2* | 12/2016 | Thiele | B64D 11/00152 |
| 9,776,722 B2* | 10/2017 | Pozzi | B64D 11/00152 |
| 2008/0023600 A1 | 1/2008 | Perlman | |
| 2009/0189039 A1 | 7/2009 | LaBuda | |
| 2011/0278885 A1* | 11/2011 | Procter | B60R 11/0235 |
| | | | 297/135 |
| 2012/0241572 A1 | 9/2012 | McClain et al. | |
| 2013/0213826 A1 | 8/2013 | Partridge | |

FOREIGN PATENT DOCUMENTS

| | | |
|---|---|---|
| CN | 203377934 U | 1/2014 |
| DE | 10 2012 112942 A1 | 6/2014 |
| EP | 2 746 158 A1 | 6/2014 |
| JP | 2009-545082 | 12/2009 |
| JP | 2014-511794 | 5/2014 |
| WO | WO 2015 010123 A1 | 1/2015 |
| WO | WO 2016/092509 A1 | 6/2016 |

OTHER PUBLICATIONS

European Communication pursuant to Article 94(3) EPC dated Mar. 1, 2019 regarding European Patent Application No. 15 719 869.8 corresponding to U.S. Appl. No. 15/561,942 (6 pages).

International Search Report dated Dec. 21, 2015 from related International Application No. PCT/SG2015/050069.

Written Opinion of the International Searching Authority dated Dec. 21, 2015 from related International Application No. PCT/SG2015/050069.

International Preliminary Report on Patentability dated Oct. 17, 2017 from related International Application No. PCT/SG2015/050069.

Chinese Office Action dated Dec. 11, 2019 regarding Chinese Patent Application No. 201580078725.5 corresponding to U.S. Appl. No. 15/561,942 (8 pages).

* cited by examiner

--Prior Art--

--Prior Art--

--Prior Art--

PORTABLE ELECTRONIC DEVICE HOLDER

CROSS-REFERENCE TO RELATED APPLICATION(S)

This application is a National Phase Patent Application and claims the priority of International Application Number PCT/SG2015/050069, filed on Apr. 13, 2015, the entire contents of which are incorporated herein by reference.

TECHNICAL FIELD

The present invention relates generally to a portable electronic device holder for a passenger seat and an integrated entertainment system for a passenger seat.

BACKGROUND

In recent years, the use of portable electronic devices (PEDs) in aircraft is becoming more and more popular. May people are choosing to use the PEDs rather than the IFE (In-Flight Entertainment) systems that are provided on board the plane.

If a seat is provided with an IFE monitor, passengers will have limited places where they can place their PEDs. They can either place their PEDs on the tray tables or in a removable pouch that is stuck to the top of the seat back. However, usage of their PEDs in these locations is limited.

FIG. 1 shows a schematic 100 illustrating a portable electronic device placed on a tray table. As shown in FIG. 1, a passenger seat 102 is provided with a tray table 104, on which a portable electronic device 106 can be placed. However, passengers are not able to use the portable electronic device 106 when the table 104 is stowed or when meals are being served. In addition, the viewing angle of the portable electronic device 106 is limited when placed on the table 104.

FIG. 2 shows a schematic 200 illustrating a portable electronic device placed in a removable pouch. As show in FIG. 2, a removable pouch 204 is attached to the seat back of a passenger seat 202, and a portable electronic device 206 is placed in the pouch 204. When placed in the pouch 204, viewing angle of the portable electronic device 206 is highly dependent on the backrest recline angle. In addition, the pouches that are typically provided by airlines can be easily taken away by passengers.

When a seat is not equipped with an IFE monitor, the location of the IFE monitor may be used to place the portable electronic device. FIG. 3 shows a schematic 300 illustrating a portable electronic device placed at the location of the IFE monitor. As shown in FIG. 3, the portable electronic device 306 is placed in the location of the passenger chair 302 where the IFE monitor should be, and is held by a holder 304 including a base support to support the portable electronic device 306 and a grip on top to hold the portable electronic device 306 inbetween.

SUMMARY

Various embodiments provide a portable electronic device holder for a passenger seat, including a longitudinal clamping structure having a generally L-shaped cross-section. The clamping structure includes a supporting flap forming an L-base of the generally L-shaped clamping structure and configured to support a portable electronic device, and a clamping flap forming an L-leg of the generally L-shaped clamping structure and configured to clamp the portable electronic device against a surface abutting the portable electronic device. The portable electronic device holder further includes a mounting element for slidably or tiltably mounting the clamping structure to the passenger seat.

Various embodiments provide a portable electronic device holder for a passenger seat, including a planar support, and a longitudinal clamping structure attached to the planar support. The clamping structure has a generally L-shaped cross-section and is configured to hold the portable electronic device between the clamping structure and the planar support. The clamping structure includes a supporting flap forming an L-base of the generally L-shaped clamping structure and configured to support the portable electronic device, and a clamping flap forming an L-leg of the generally L-shaped clamping structure and configured to clamp the portable electronic device against the planar support. The portable electronic device holder further includes a mounting element for slidably or tiltably mounting the portable electronic holder to the passenger seat.

Various embodiments provide an integrated entertainment system, including a monitor mounted to a back of the passenger seat, and a longitudinal clamping structure mounted to the monitor. The clamping structure has a generally L-shaped cross-section and is configured to hold a portable electronic device between the monitor and the clamping structure. The clamping structure includes a supporting flap forming an L-base of the generally L-shaped clamping structure, and configured to support the portable electronic device, and a clamping flap forming an L-leg of the generally L-shaped clamping structure, and configured to clamp the portable electronic device against the monitor. The integrated entertainment system further includes a mounting element for slidably or tiltably mounting the clamping structure to the monitor.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Various embodiments provide a portable electronic device holder for a passenger seat, for example, an aircraft seat.

In this context, the word "exemplary" is used herein to mean "serving as an example, instance, or illustration". Any embodiment or design described herein as "exemplary" is not necessarily to be construed as preferred or advantageous over other embodiments or designs.

In this context, it should be understood that the terms "side", "top", "back" etc., when used in the following description are used for convenience and to aid understanding of relative positions or directions in relation to the portable electronic device, and not intended to limit the portable electronic device of various embodiments.

Figure 1:
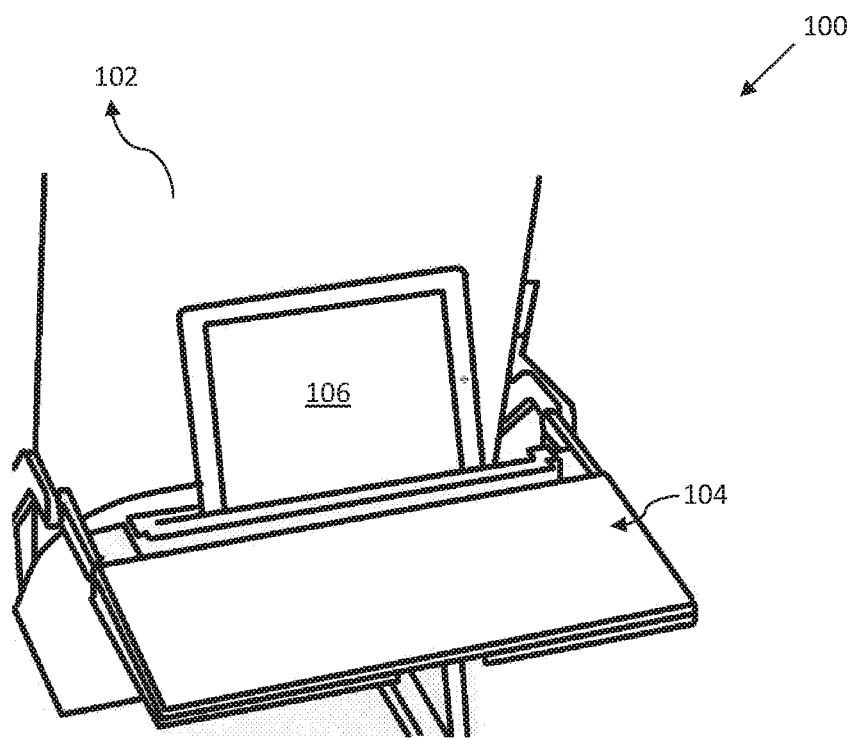
FIG. 1 shows a schematic illustrating a portable electronic device placed on a tray table.
Figure 2:
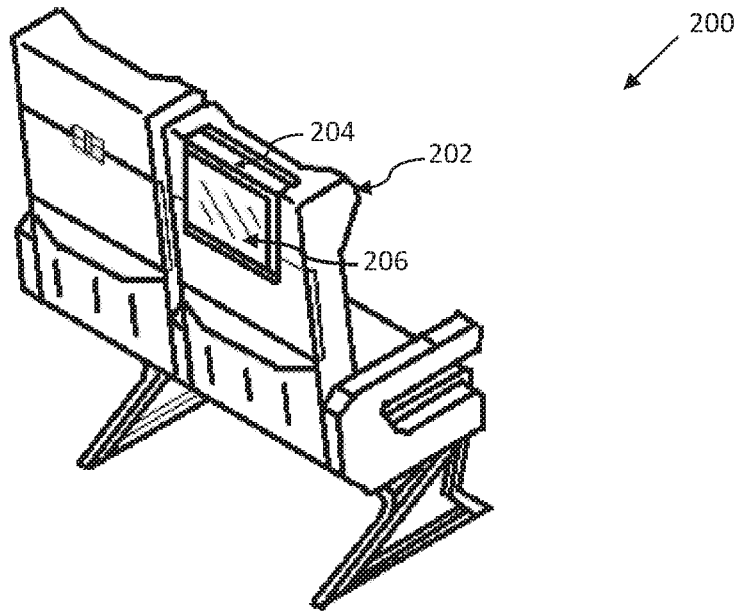
FIG. 2 shows a schematic illustrating a portable electronic device placed in a removable pouch.
Figure 3:
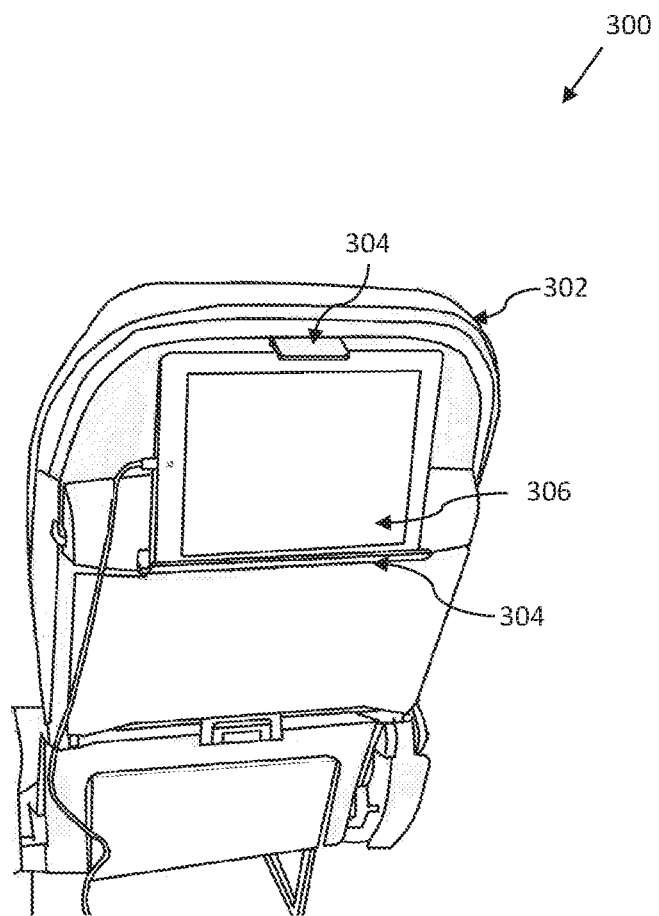
FIG. 3 shows a schematic illustrating a portable electronic device placed at the location of the IFE monitor.
Figure 4:
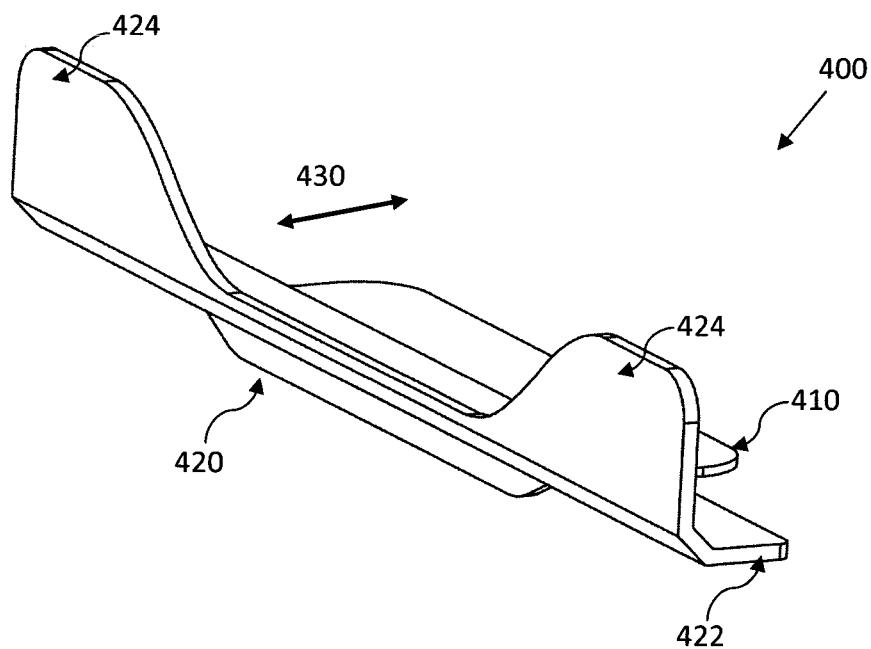
FIG. 4 shows a portable electronic device (PED) holder for a passenger seat according to various embodiments.

FIG. 4 shows a portable electronic device (PED) holder 400 for a passenger seat according to various embodiments. The PED holder may include a longitudinal clamping structure 420 having a generally L-shaped cross-section as shown in FIG. 4.

The clamping structure 420 may include a supporting flap 422 forming an L-base of the generally L-shaped clamping structure 420 and configured to support a portable electronic device (not shown). The clamping structure 420 may include a clamping flap 424 forming an L-leg of the generally L-shaped clamping structure 420 and configured to clamp the portable electronic device against a surface abutting the portable electronic device. The portable electronic device holder 400 may further include a mounting element 410 for slidably mounting the clamping structure 420 to the passenger seat (not shown).

In exemplary embodiments shown in FIG. 4, the clamping structure 420 is configured to be mounted to a back of the passenger seat slidably in a direction 430 at least substantially perpendicular to a plane of the back of the seat to adjust a space between the clamping flap 424 and the surface abutting the portable electronic device. The direction 430 at least substantially perpendicular to the plane of the back of the seat is also referred to as a translational direction 430 in this context.

In various embodiments, the mounting element 410 may be a strip-like structure for slidably mounting the clamping structure 420 to the passenger seat, e.g. by coupling or inserting into a guide provided at the passenger seat.

In various embodiments, the mounting element 410 is provided for tiltably mounting the clamping structure 420 to the passenger seat. The mounting element 410 may include a hinge for tiltably mounting the clamping structure 420 to the passenger seat. The clamping structure 420 is tiltable relative to the back of the passenger seat to adjust a viewing angle of the portable electronic device.

Figure 5:
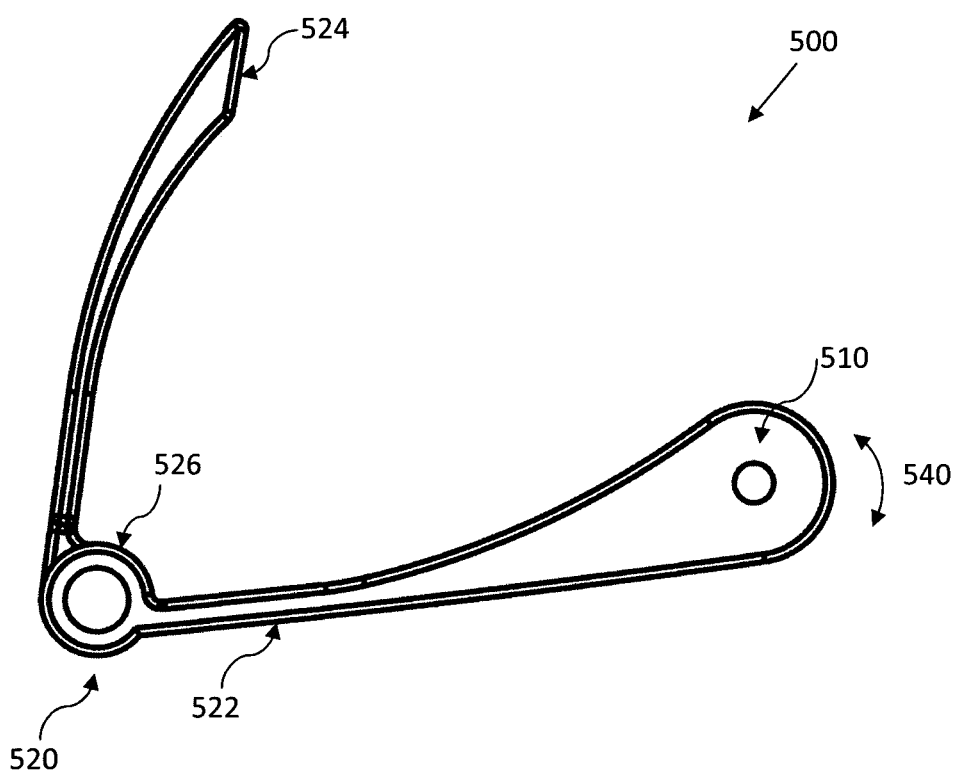
FIG. 5 shows a portable electronic device holder for a passenger seat according to various embodiments.

FIG. 5 shows a side view of a portable electronic device (PED) holder 500 for a passenger seat according to various embodiments. Similar to FIG. 4, the PED holder 500 may include a longitudinal clamping structure 520 having a generally L-shaped cross-section as shown in FIG. 5.

Similar to the PED holder 400 of FIG. 4, the clamping structure 520 may include a supporting flap 522 forming an L-base of the generally L-shaped clamping structure 520 and configured to support a portable electronic device (not shown). The clamping structure 520 may include a clamping flap 524 forming an L-leg of the generally L-shaped clamping structure 520 and configured to clamp the portable electronic device against a surface abutting the portable electronic device. In the exemplary embodiments of FIG. 5, the portable electronic device holder 500 may further include a mounting element 510 for tiltably mounting the clamping structure 520 to the passenger seat (not shown).

In the embodiments shown in FIG. 5, the mounting element 510 is provided for tiltably mounting the clamping structure 520 to the passenger seat. The clamping structure 520 is tiltable relative to the back of the passenger seat in a rotational direction 540 to adjust a viewing angle of the portable electronic device.

The tiltable PED holder allows the passenger to adjust the PED holder's viewing angle in order to compensate the change in viewing angle when the backrest in front of the passenger changes it recline angle. In addition, the PED holder may be placed at the upper section of the seatback, which will allow passengers to look at their PED comfortably without staining their necks.

In various embodiments of FIG. 4 and FIG. 5, the surface abutting the portable electronic device may be the seat back of the passenger seat, for example, when the PED holder 400, 500 is directly mounted to the seat back of the passenger seat. In various embodiments, the surface abutting the portable electronic device may be a monitor, for example, an in-flight entertainment (IFE) monitor mounted to the passenger seat. In various embodiments, the surface abutting the portable electronic device may be a planar support, which may be mounted to the passenger seat directly or through the clamping structure 520.

In various embodiments, the mounting element 410, 510 may be integrally formed together with the supporting flap 422, 522 of the clamping structure 420, 520. In other embodiments, the mounting element 410, 510 may be connected to the clamping structure 420, 520, e.g. the mounting element 410, 510 may be separate pieces which is joined or connected to the clamping structure 420, 520.

Figure 8:
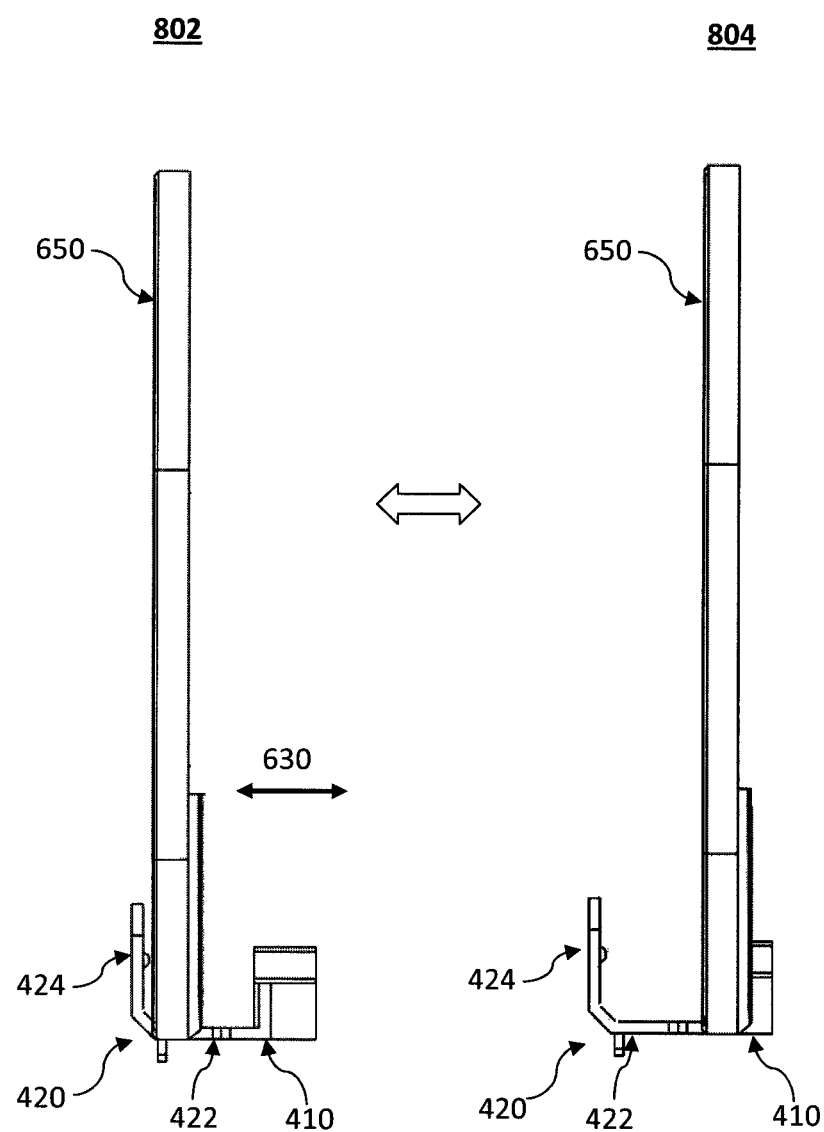
FIG. 8 shows side views of a slide-in and a slide-out state of the PED holder of FIG. 7 according to various embodiments.
Figure 9:
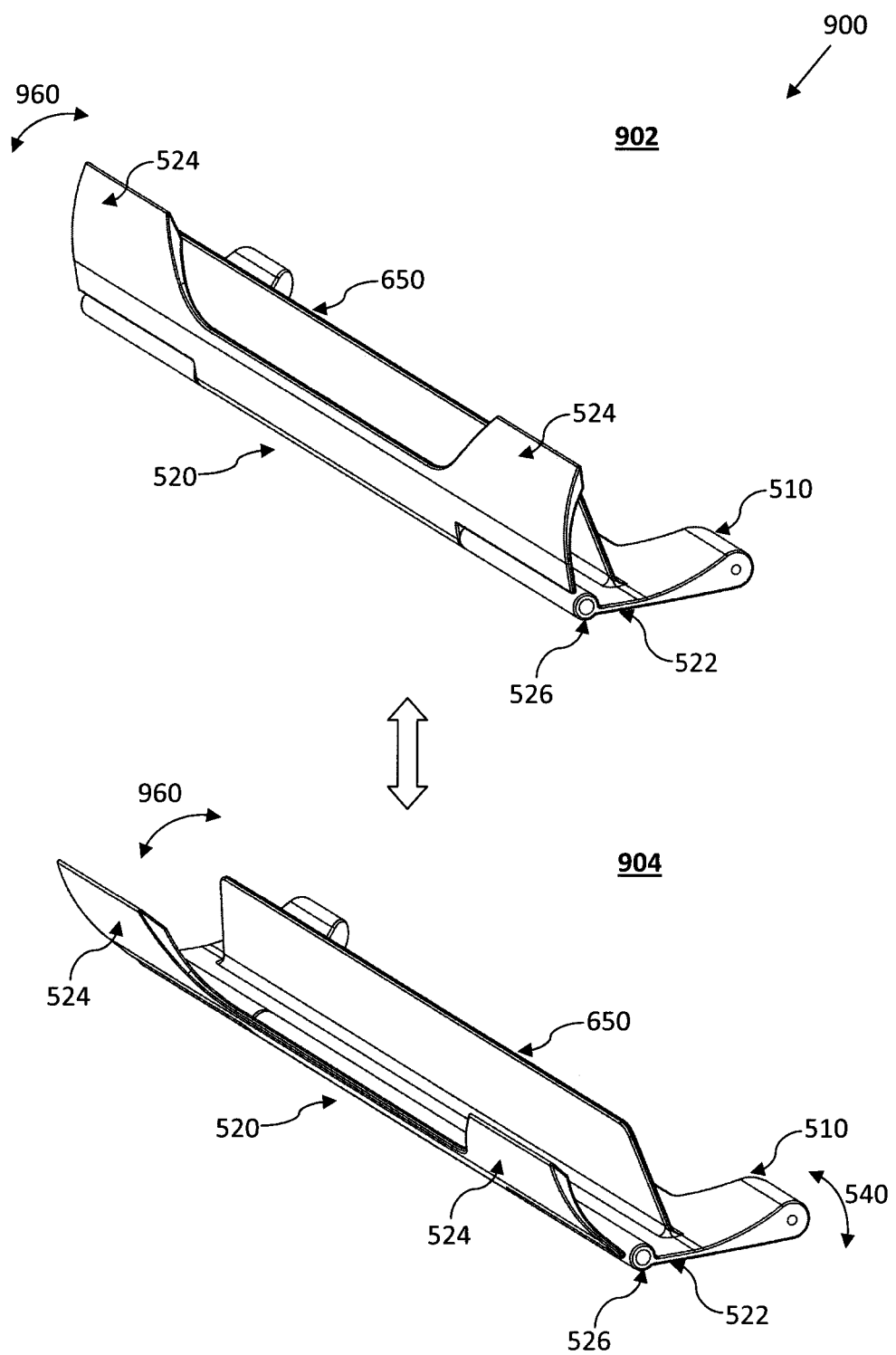
FIG. 9 shows perspective views of a closed state and an open state of a PED holder according to various embodiments.

In the context of this description, a flap refers to a generally flat piece with a longitudinal shape or strip shape. In various embodiments, the supporting flap may be a strip-like structure having a flat and longitudinal top surface for supporting and receiving the portable electronic device thereon, e.g. the supporting flap 422, 522 as shown in FIG. 4 and FIG. 5 for supporting the portable electronic device standing on the top surface of the supporting flap. In various embodiments, the clamping flap may be a longitudinal structure having a flat surface, e.g. the clamping flap 424 as shown in FIG. 4 and FIG. 8 below. In various embodiments, the clamping flap may be a longitudinal structure having a curved shape or cross-section, e.g. the clamping flap 524 as shown in FIG. 5 and FIG. 9 below.

The clamping flap and the supporting flap may be fixedly or pivotably connected to each other at their longitudinal edges. By way of example, the clamping flap is configured to clamp or abut a front plane of the portable electronic device against the surface abutting a back plane of the portable electronic device when the portable electronic device is supported on the supporting flap.

In various embodiments of FIG. 4 and FIG. 5, the clamping flap 424, 524 may be pivotably coupled to the supporting flap 422, 522 through a hinge, e.g. the hinge 526 shown in FIG. 5. In various embodiments, the clamping flap 424, 524 may be pivotable to adjust a space between the clamping flap 424, 524 and the surface abutting the portable electronic device.

The clamping flap 424, 524 may be formed as a single flap, or may be formed by a plurality of portions connected by interconnecting portions (e.g. as shown in FIG. 4), or may be formed by a plurality of portions separated from each other. In various embodiments, the clamping flap 424, 524 may be made of transparent material, to prevent or minimize blockage of the effective area (e.g. the screen) of the PED. In various embodiments, the entire clamping structure 420, 520 may be made of transparent material, for example, to prevent or minimize blockage of PED effective area.

In various embodiments, the clamping structure 420, 520 may include a biasing element, e.g. a spring, configured to urge the clamping flap 424, 524 towards the supporting flap 422, 522, thereby exerting a force to clamp the portable electronic device against the surface abutting the portable electronic device when the portable electronic device is supported on the supporting flap 422, 522.

The clamping structure 420, 520 movable in translational motion, or rotational motion, or both translational and rotational motion, is provided to cater for PEDs of different thickness and/or to adjust the viewing angle of the PEDs, and is also referred to as an adjustable grip in this context.

The adjustable clamping structure 420, 520 may be designed with different shape and size to suit for seat recline and targeted PED requirements. The strength of the adjustable clamping structure may also be adjusted to cater for different PEDs. In various embodiments, the clamping structure may be designed with different grip/clamping force to suit for different seat recline and targeted PEDs.

Figure 6:
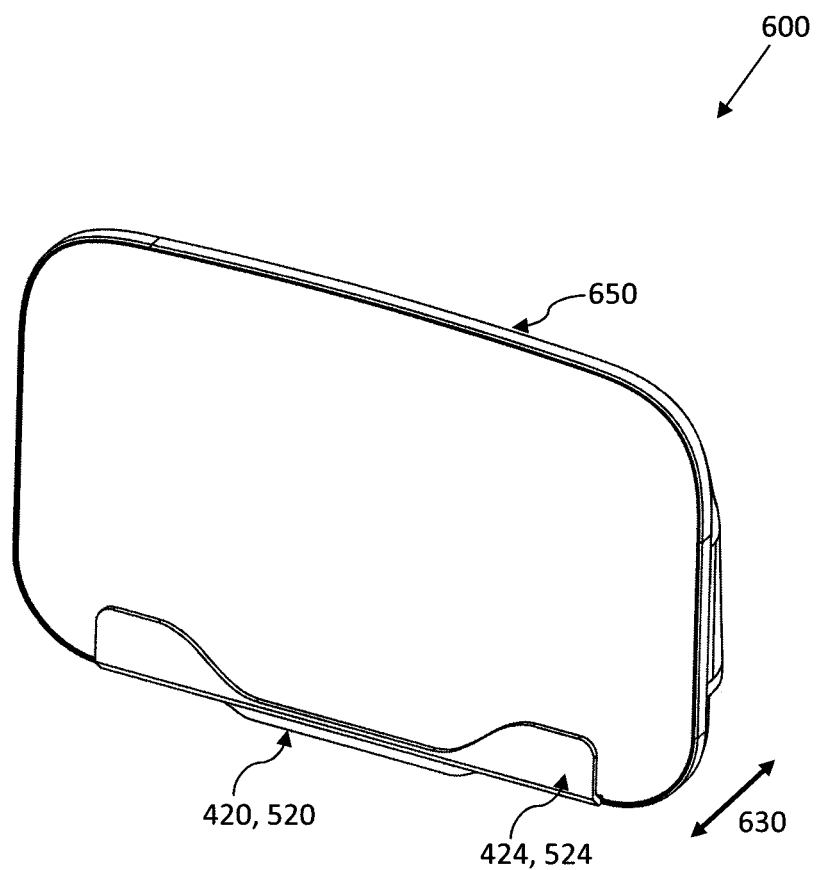
FIG. 6 shows a PED holder together with a surface abutting the PED according to various embodiments.

FIG. 6 shows a PED holder 600 together with a surface abutting the PED according to various embodiments.

The PED holder 600 may include a clamping structure 420, 520 described above, which includes a clamping flap 424, 524 configured to clamp a PED (not shown) against a surface 650 abutting the PED. In various embodiments, the surface 650 may be a seat back of the passenger seat, or may be a monitor, or may be a planar support. The PED is clamped between the clamping flap 424, 524 and the surface 650.

In illustrative embodiments, the surface 650 may be the back of the passenger seat, and the PED holder 600 is mounted across the back of the passenger seat in a horizontal direction such that the supporting flap of the clamping structure 420, 520 is oriented horizontally and the longitudinal axis of the clamping structure 420, 520 is oriented horizontally and is parallel to the plane of the back of the passenger seat. The clamping flap is oriented substantially vertically or inclined inward toward the back of the passenger seat to clamp the PED between the clamping flap and the back of the passenger seat. The PED holder 600 may be slidably or tiltably mounted to the back of the passenger seat by a mounting element 410, 510, e.g., shown in FIGS. 7-10 below.

In illustrative embodiments, the surface 650 may be a planar support or a monitor included in the PED holder 600. The entire PED holder 600 is mounted across the back of the passenger seat in a horizontal direction such that the longitudinal axis of the clamping structure 420, 520 is oriented horizontally and is parallel to the plane of the back of the passenger seat. The clamping flap is oriented substantially vertically or inclined inward toward the planar support/monitor to clamp the PED between the clamping flap and the planar support/monitor. The entire PED holder 600 may be fixedly or tiltably mounted to the back of the passenger seat by a mounting element, e.g., shown in FIGS. 11-15 below.

Figure 7:
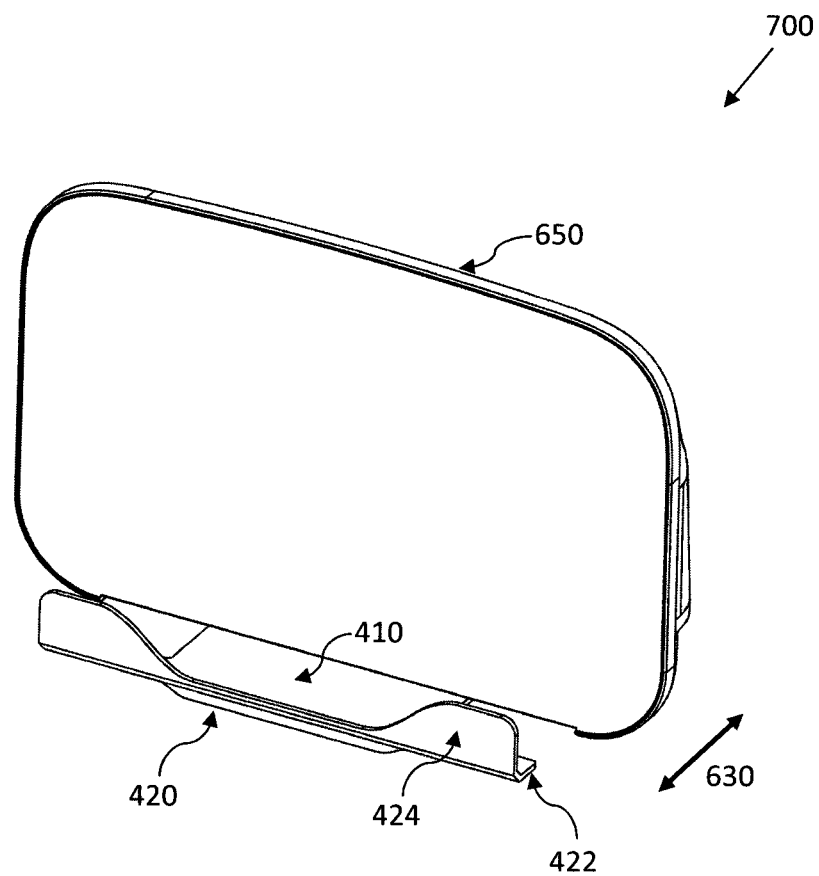
FIG. 7 shows a PED holder together with a surface abutting the PED according to various embodiments.

FIG. 7 shows a PED holder 700 together with a surface abutting the PED according to various embodiments.

The PED holder 700 may include a clamping structure 420 described in various embodiments above, which includes a clamping flap 424 configured to clamp a PED (not shown) against a surface 650 abutting the PED.

The surface 650 may be a seat back of the passenger seat, or may be a monitor, or may be a planar support. The PED is clamped between the clamping flap 424 and the surface 650.

The mounting element 410 is provided for slidably mounting the clamping structure 420 to the passenger seat. In various embodiments, the mounting element 410 is configured to slidably mount the clamping structure 420 to the seat back 650 of the passenger seat directly. In various embodiments, the clamping structure 420 is slidably mounted to the seat back of the passenger seat indirectly through a monitor 650 or a planar support 650. In various embodiments, the clamping structure 420 may be slidably mounted or coupled to the planar support 650. In various embodiments, the clamping structure 420 may be slidably mounted or coupled to the monitor 650, in which the PED holder 700 may be referred to as an integrated entertainment system.

In exemplary embodiments shown in FIG. 7, the clamping structure 420 is slidably mounted to the surface 650, such that the clamping structure 420 is moveable or slidable in the translational direction 630 to adjust a space between the clamping flap 424 and the surface 650 abutting the portable electronic device.

FIG. 8 shows side views of a slide-in and a slide-out state of the PED holder 700 of FIG. 7 according to various embodiments.

As shown in FIG. 8, in the slide-in state 802, the clamping flap 424 of the clamping structure 420 is in physical contact or is abutting the surface 650. When using the PED holder, the clamping structure 420 is moved or slide in the translational direction 630 to reach the slide-out state 804, in order to adjust a space between the clamping flap 424 and the surface 650 abutting the portable electronic device. The mounting element 410 may include a guide for guiding the translational motion of the clamping structure 420, and may include a stopper for stopping the translational motion of the clamping structure 420.

The adjustable clamping structure 420 of various embodiments slides in and out of the surface 650 (e.g. IFE monitor/planar support/seat back) in the translational motion. Guides may be installed within the assembly of the PED holder or at the passenger seat to provide the sliding mechanism, e.g. similar to the sliding mechanism of a drawer.

In various embodiments, the mounting element 410 may include a hinge, and may be configured to tiltably mount the clamping structure to the surface 650.

Various embodiments provide a PED holder, e.g., the PED holder 700 of FIGS. 7-8, for a passenger seat, including a planar support, a longitudinal clamping structure attached to the planar support, and a mounting element for slidably mounting the PED holder to the passenger seat. The clamping structure may have a generally L-shaped cross-section, and is configured to hold the portable electronic device between the clamping structure and the planar support. The clamping structure may include a supporting flap forming an L-base of the generally L-shaped clamping structure and configured to support the portable electronic device, and a clamping flap forming an L-leg of the generally L-shaped clamping structure and configured to clamp the portable electronic device against the planar support.

In various embodiments, the portable electronic device holder is configured to be mounted to a back of the passenger seat slidably in a direction at least substantially perpendicular to a plane of the back of the seat to adjust a space between the clamping flap and the planar support.

In various embodiments, the clamping structure is attached to the planar support slidably in a direction at least substantially perpendicular to a plane of the planar support and/or a plane of the back of the seat to adjust a space between the clamping flap and the planar support.

In various embodiments, the clamping structure is tiltable relative to a back of the passenger seat to adjust a viewing angle of the portable electronic device.

In various embodiments, the clamping flap is pivotably coupled to the supporting flap through a hinge. In various embodiments, the clamping flap is pivotable to adjust a space between the clamping flap and the planar support.

In various embodiments, the clamping structure includes a biasing element configured to urge the clamping flap towards the supporting flap. In this manner, the biasing element is configured to exert a force to clamp the portable electronic device against the planar support, when the portable electronic device is held by the portable electronic device holder.

In various embodiments, the mounting element may be integrally formed together with the supporting flap of the clamping structure. In other embodiments, the mounting element may be connected to the clamping structure, e.g. the mounting element may be separate pieces which is joined or connected to the clamping structure.

In various embodiments, a further mounting element may be provided for tiltably mounting the planar support to the passenger seat.

In various embodiments, the clamping flap is made of transparent material.

Various embodiments provide an integrated entertainment system, e.g. the integrated entertainment system 700 of FIGS. 7-8, for a passenger seat, including a monitor mounted to a back of the passenger seat, a longitudinal clamping structure mounted to the monitor, and a mounting element for slidably mounting the clamping structure to the monitor. The clamping structure may have a generally L-shaped cross-section, and is configured to hold the portable electronic device between the clamping structure and the planar support. The clamping structure may include a supporting flap forming an L-base of the generally L-shaped clamping structure and configured to support the portable electronic device, and a clamping flap forming an L-leg of the generally L-shaped clamping structure and configured to clamp the portable electronic device against the monitor.

In various embodiments, wherein the clamping structure is mounted to the monitor slidably in a direction at least substantially perpendicular to a surface of monitor to adjust a space between the clamping flap and the monitor.

In various embodiments, the clamping flap is pivotably coupled to the supporting flap through a hinge. In various embodiments, the clamping flap is pivotable to adjust a space between the clamping flap and the monitor.

In various embodiments, the clamping structure includes a biasing element configured to urge the clamping flap towards the supporting flap, thereby exerting a force to clamp the portable electronic device against the monitor when the portable electronic device is held by the integrated entertainment system.

In various embodiments, the mounting element may be integrally formed together with the supporting flap of the clamping structure. In other embodiments, the mounting element may be connected to the clamping structure, e.g. the mounting element may be separate pieces which is joined or connected to the clamping structure.

In various embodiments, a further mounting element may be provided for tiltably mounting the monitor to the passenger seat.

In various embodiments, the clamping flap is made of transparent material.

Figure 10:
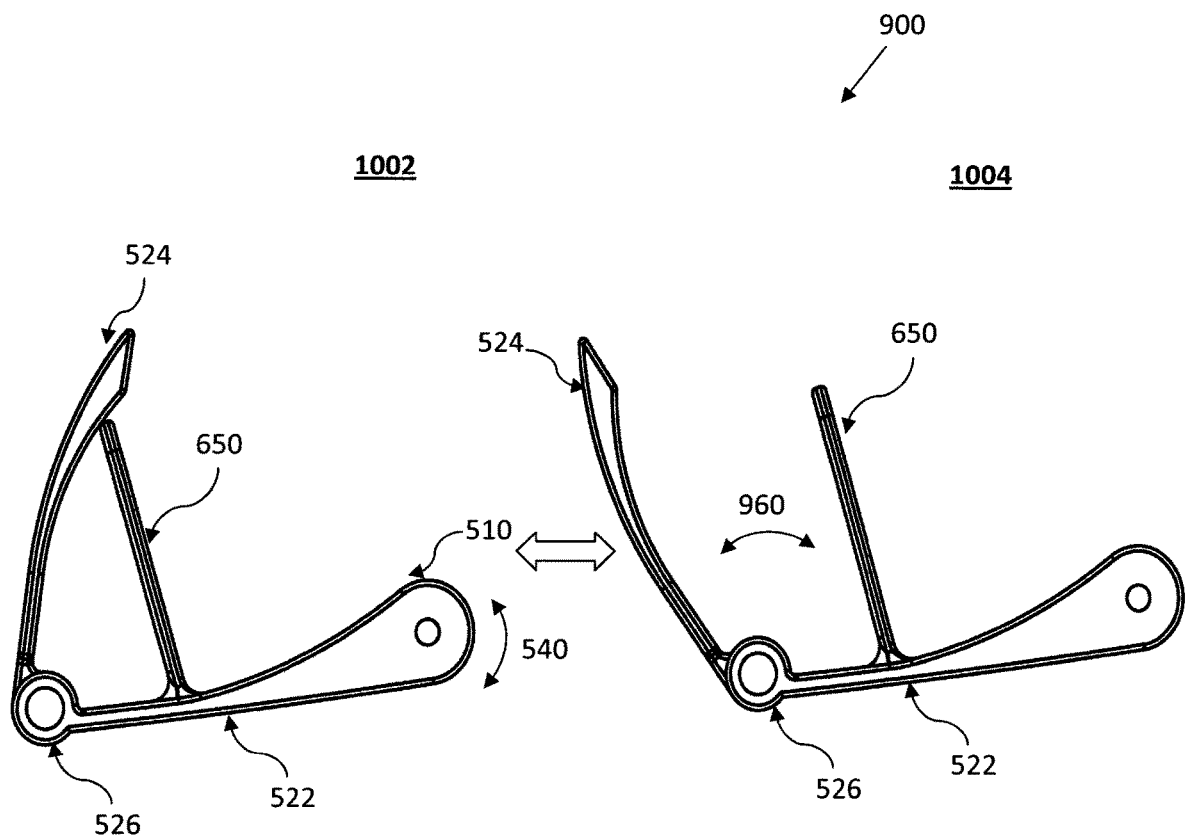
FIG. 10 shows side views of the closed state and the open state of the PED holder of FIG. 9 according to various embodiments.

FIG. 9 shows perspective views of a closed state and an open state of a PED holder according to various embodiments, and FIG. 10 shows side views of the closed state and the open state of the PED holder of FIG. 9 according to various embodiments.

The PED holder 900 may be the PED holder 600 of FIG. 6, including a clamping structure 520 and a mounting element 510 of FIG. 5 described in various embodiments above. The clamping structure 520 includes the clamping flap 524 configured to clamp a PED (not shown) against the surface 650 abutting the PED.

The surface 650 may be a seat back of the passenger seat, or may be a monitor, or may be a planar support. The PED is clamped between the clamping flap 524 and the surface 650.

Similar to the embodiments shown in FIG. 5, the mounting element 510 is provided for tiltably mounting the clamping structure 520 to the passenger seat. When tiltably mounted to the passenger seat, the clamping structure 520 is tiltable relative to the passenger seat in a rotational direction to adjust a viewing angle of the portable electronic device.

In various embodiments, the mounting element 510 is configured to tiltably mount the clamping structure 520 to the seat back 650 of the passenger seat directly. For example, the mounting element 510 may include two pieces as shown in FIG. 9, which may be respectively installed at the two opposing sides of the passenger seat, or may be installed at the seat back of the passenger seat. In various embodiments, the clamping structure 520 is tiltably mounted to the seat back of the passenger seat through a monitor 650 or a planar support 650 as described in more detail below. It is understood that the mounting element 510 may be an integral piece, or may include a plurality of separated mounting pieces.

In various embodiments, the clamping structure 520 may further be slidably mounted or coupled to the planar support 650, such that the clamping structure 520 may be slidable relative to the planar support as in FIG. 8. In various embodiments, the clamping structure 520 may be slidably mounted or coupled to the monitor 650 such that the clamping structure 520 may be slidable relative to the monitor as in FIG. 8, and the PED holder 900 may be referred to as an integrated entertainment system.

The surface 650 abutting the portable electronic device may be the seat back of the passenger seat, for example, when the PED holder 900 is directly mounted to the seat back of the passenger seat. In various embodiments, the surface 650 abutting the portable electronic device may be a monitor or a planar support mounted to the passenger seat.

In various embodiments, the PED holder 900 may be provided to include the clamping structure 520, the mounting element 510, and a planar support/monitor 650 integrated together, such that the entire PED holder may be installed to the passenger seat, or to other objects, such as wall, desk, etc.

In various embodiments, the mounting element 510 may be integrally formed together with the supporting flap 522 of the clamping structure 520. In other embodiments, the mounting element 510 may be connected to the clamping structure, e.g. the mounting element may be separate pieces which is joined or connected to the clamping structure 520.

In various embodiments, the clamping flap 524 may be pivotably coupled to the supporting flap 522 through a hinge 526. In various embodiments, the clamping flap 524 may be pivotable to adjust a space between the clamping flap 524 and the surface 650 abutting the portable electronic device.

In various embodiments, the clamping structure 520 may include a biasing element, e.g. a spring, configured to urge the clamping flap 524 towards the supporting flap 522, thereby exerting a force to clamp the portable electronic device against the surface abutting the portable electronic device.

As shown in FIG. 9 and FIG. 10, in the closed states 902, 1002, the clamping flap 524 is urged towards the supporting flap 522 and is abutting the surface 650. In the open states 904, 1004, the camping flap 524 is pivoted along the hinge 526 in the rotational direction 960, thereby to open the space between the clamping flap 524 and the surface 650. In this manner, the space between the clamping flap 524 and the surface 650 for clamping PEDs can be adjusted to cater for PEDs of different widths.

The PED holder is pivotable or rotatable about a hinge as shown in FIG. 9 and FIG. 10. The passenger may pull the clamping flap 524 to open the clamping structure 520, so as to open up a space that a PED can be fitted in between the clamping structure 520 and the surface 650.

In various embodiments, the clamping structure 520 is movable in translational motion, or rotational motion, or both translational and rotational motion, and is provided to cater for PEDs of different thickness and/or to adjust the viewing angle of PEDs.

In various embodiments, the clamping flap 524 may be formed as a single flap, or may be formed by a plurality of portions connected by interconnecting portions, or may be formed by a plurality of portions separated from each other. In various embodiments, the clamping flap 524 may be made of transparent material, to prevent or minimize blockage of the effective area (e.g. the screen) of the PED. In various embodiments, the entire clamping structure 520 may be made of transparent material.

Figure 11:
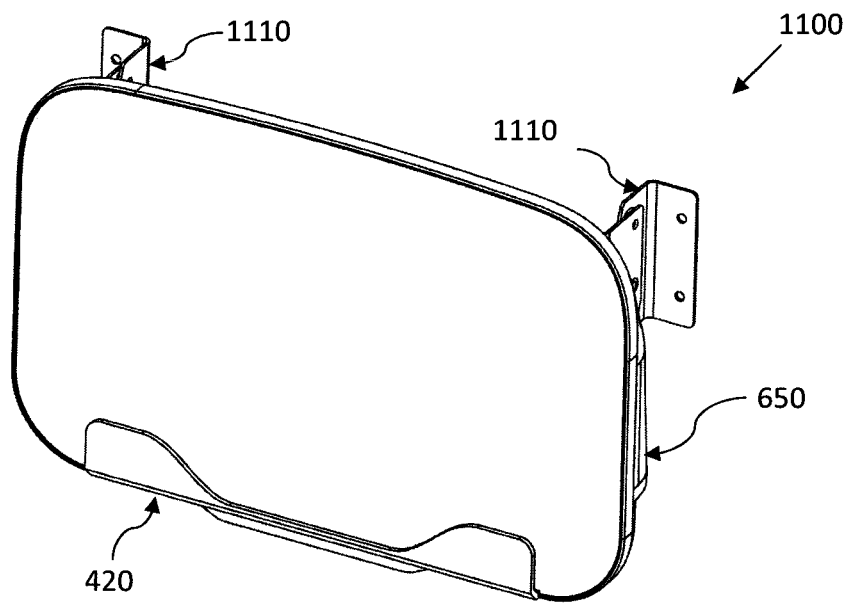
FIG. 11 shows a PED holder according to various embodiments.

FIG. 11 shows a PED holder 1100 according to various embodiments.

The PED holder 1100 may include a clamping structure 420 described in various embodiments above, and a planar support 650. The clamping structure 420 includes a clamping flap configured to clamp a PED (not shown) against the planar support 650 abutting the PED.

The planar support 650 may be a monitor, and the PED holder 1100 including the monitor is referred to as an integrated entertainment system.

In exemplary embodiments shown in FIG. 11, the clamping structure 420 is slidably mounted to the surface 650, such that the clamping structure 420 is moveable or slidable in the translational direction to adjust a space between the clamping flap of the clamping structure 420 and the surface 650 abutting the portable electronic device, similar to the embodiments of FIG. 7.

In the embodiments of FIG. 11, a mounting element 1110 is provided for mounting the planar support/monitor 650 to the passenger seat. The angle between the passenger seat and the planar support/monitor 650 may be fixed, e.g. to align the planar support/monitor 650 substantially parallel to the plane of the back of the passenger seat.

Figure 12:
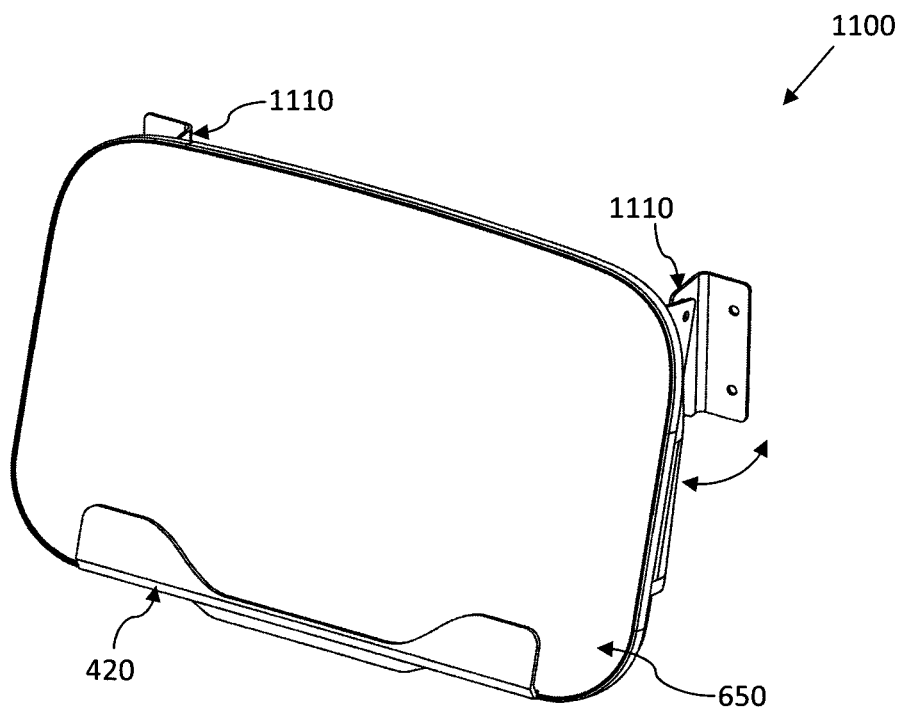
FIG. 12 shows a PED holder according to various embodiments.
Figure 13:
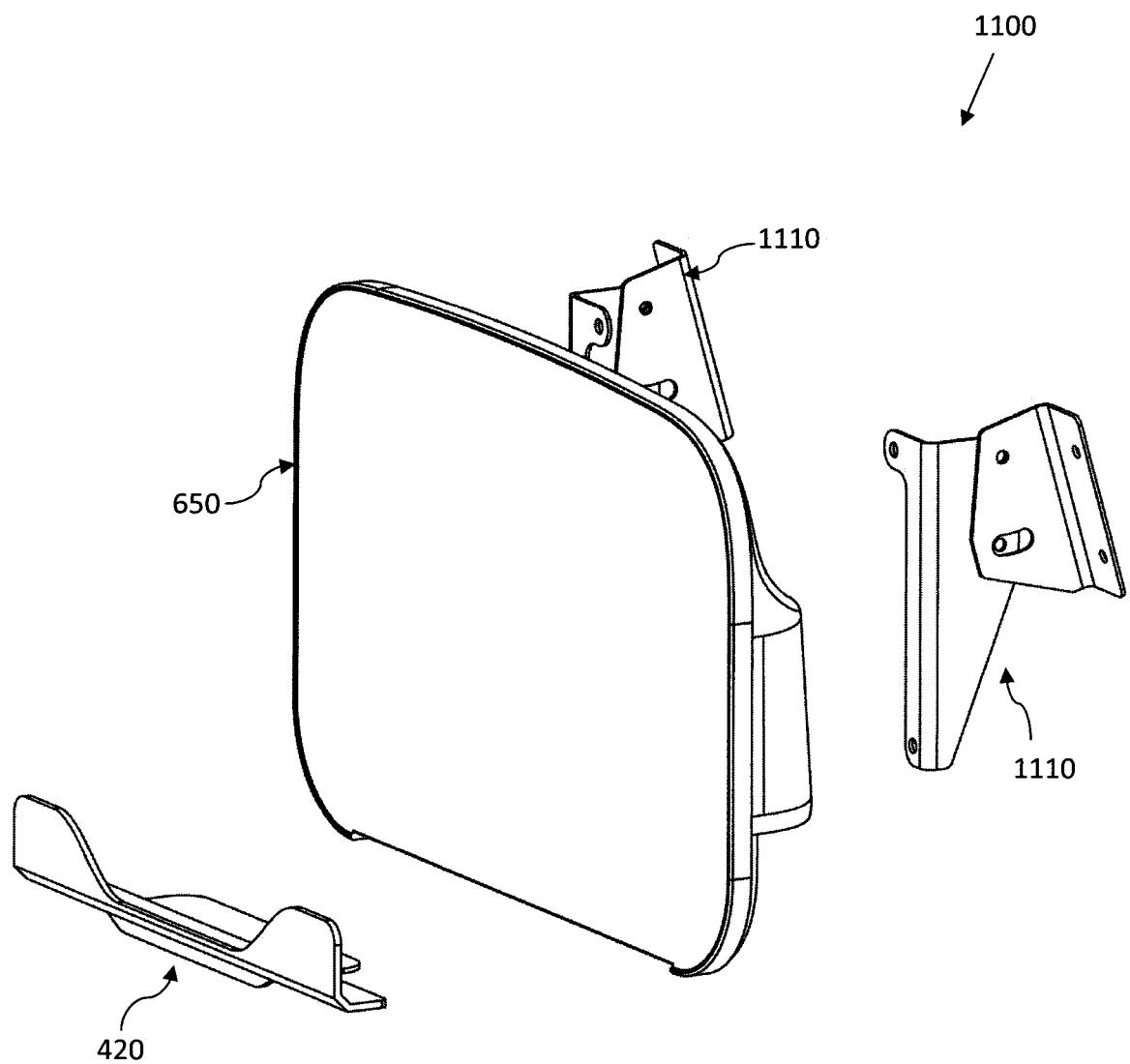
FIG. 13 shows an exploded view of the PED holder of FIG. 12 according to various embodiments.

FIG. 12 shows a PED holder according to various embodiments, and FIG. 13 shows an exploded view of the PED holder of FIG. 12 according to various embodiments.

The PED holder 1100 of FIG. 12 and FIG. 13 may be the PED holder described in FIG. 11 above. In various embodiments, the mounting element 1110 may include a hinge, such that the mounting element 1110 is configured to tiltably mount the planar support/monitor 650 to the passenger seat. When tiltably mounted to the passenger seat, the planar support/monitor 650 is tiltable relative to the passenger seat in a rotational direction to adjust a viewing angle of the portable electronic device clamped between the planar support/monitor 650 and the clamping structure 420.

In various embodiments, the mounting element 1110 may include two pieces as shown in FIGS. 11-13, which may be respectively located at the two opposing corners or side edges of the planar support/monitor 650 for mounting to the passenger seat. In various embodiments, the mounting element 1110 may be a single piece, for example, located at the top edge of the planar support/monitor 650. In various embodiments, the mounting element 1110 may include a plurality of pieces.

Figure 14:
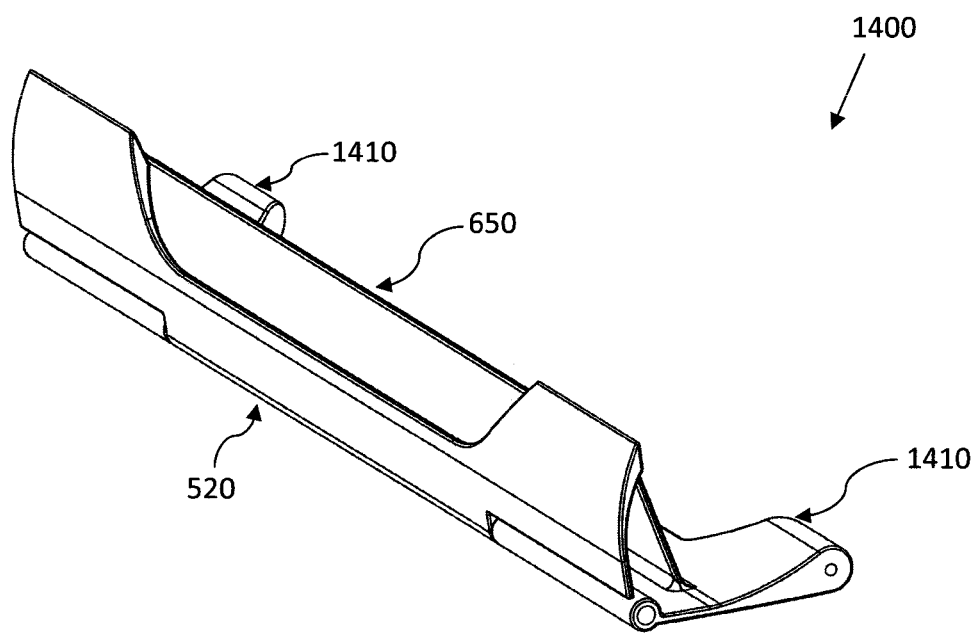
FIG. 14 shows a PED holder according to various embodiments.
Figure 15:
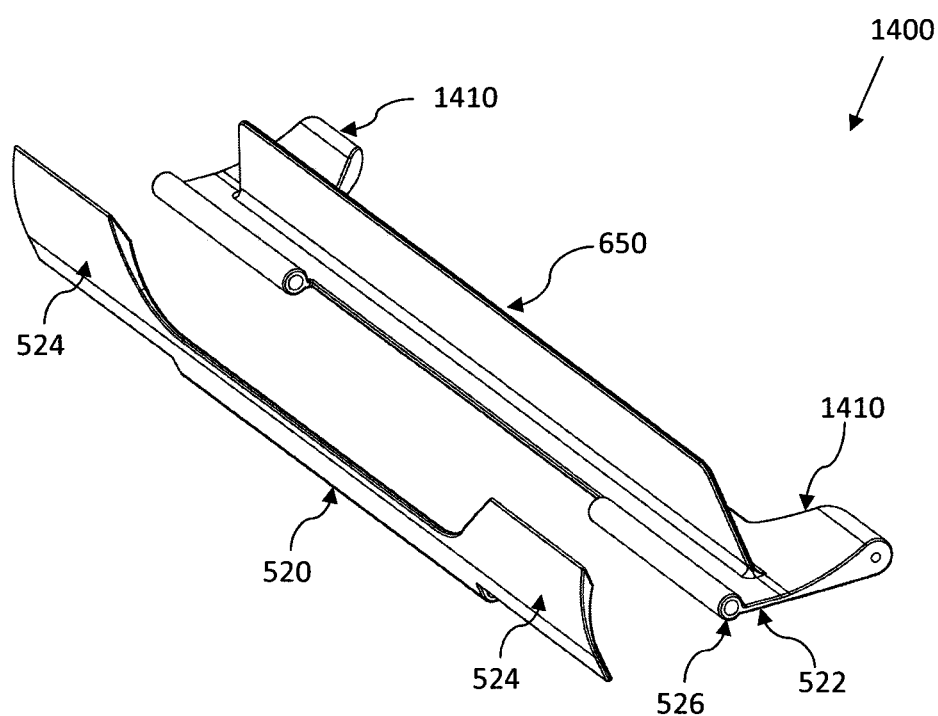
FIG. 15 shows an exploded view of the PED holder of FIG. 14 according to various embodiments.

FIG. 14 shows a PED holder according to various embodiments, and FIG. 15 shows an exploded view of the PED holder of FIG. 14 according to various embodiments.

The PED holder 1400 is similar to the PED holder of FIG. 9, including a clamping structure 520 and a mounting element 1410 similar to the mounting element 510 of FIG. 5 described in various embodiments above. The clamping structure 520 includes the clamping flap 524 configured to clamp a PED (not shown) against a planar support/monitor 650 abutting the PED.

In various embodiments, the planar support/monitor 650 may be mounted on the supporting flap 522 of the clamping structure 520. In various embodiments, the PED holder 1400 including the monitor 650 is referred to as an integrated entertainment system.

In various embodiments, the PED holder 1400 may be provided to include the clamping structure 520, the mounting element 1410, and the planar support/monitor 650 integrated together, such that the entire PED holder/integrated entertainment system may be installed to the passenger seat, or to other objects, such as wall, desk, etc.

Similar to the embodiments of FIG. 5 and FIG. 9, the mounting element 1410 is provided for tiltably mounting the clamping structure 520 to the passenger seat. When tiltably mounted to the passenger seat, the clamping structure 520 is tiltable relative to the passenger seat in a rotational direction to adjust a viewing angle of the portable electronic device.

In various embodiments, the mounting element 1410 is configured to tiltably mount the clamping structure 520 to the seat back of the passenger seat directly. For example, the mounting element 1410 may include two pieces as shown in FIG. 14 and FIG. 15, which may be respectively installed at the two opposing sides of the passenger seat, or may be installed at the seat back of the passenger seat. It is understood that the mounting element 1410 may be an integral piece, or may include a plurality of separated mounting pieces.

In various embodiments, the mounting element 1410 may be integrally formed together with the supporting flap 522 of the clamping structure 520. In other embodiments, the mounting element 1410 may be connected to the clamping structure 520.

In various embodiments, the clamping flap 524 may be pivotably coupled to the supporting flap 522 through the hinge 526. In various embodiments, the clamping flap 524 may be pivotable to adjust a space between the clamping flap 524 and the planar support/monitor 650 abutting the portable electronic device.

In various embodiments, the clamping structure 520 may include a biasing element, e.g. a spring, configured to urge the clamping flap 524 towards the supporting flap 522, thereby exerting a force to clamp the portable electronic device against the planar support/monitor 650 abutting the portable electronic device when the PED is held.

Various embodiments provide a PED holder, e.g., the PED holder 1100 of FIGS. 11-13 or the PED holder 1400 of FIGS. 14-15, for a passenger seat, including a planar support, a longitudinal clamping structure attached to the planar support, and a mounting element for tiltably mounting the PED holder to the passenger seat. The clamping structure may have a generally L-shaped cross-section, and is configured to hold the portable electronic device between the clamping structure and the planar support. The clamping structure may include a supporting flap forming an L-base of the generally L-shaped clamping structure and configured to support the portable electronic device, and a clamping flap forming an L-leg of the generally L-shaped clamping structure and configured to clamp the portable electronic device against the planar support.

In various embodiments, the portable electronic device holder is configured to be mounted to a back of the passenger seat slidably in a direction at least substantially perpendicular to a plane of the back of the seat to adjust a space between the clamping flap and the planar support.

In various embodiments, the clamping structure is attached to the planar support slidably in a direction at least substantially perpendicular to a plane of the planar support and/or a plane of the back of the seat to adjust a space between the clamping flap and the planar support.

In various embodiments, wherein the clamping structure is tiltable relative to a back of the passenger seat to adjust a viewing angle of the portable electronic device.

In various embodiments, the clamping flap is pivotably coupled to the supporting flap through a hinge. In various embodiments, the clamping flap is pivotable to adjust a space between the clamping flap and the planar support.

In various embodiments, the clamping structure includes a biasing element configured to urge the clamping flap towards the supporting flap, thereby exerting a force to clamp the portable electronic device against the planar support when the PED is held.

In various embodiments, the mounting element may be integrally formed together with the supporting flap of the clamping structure. In other embodiments, the mounting element may be connected to the clamping structure, e.g. the mounting element may be separate pieces which is joined or connected to the clamping structure.

In various embodiments, the portable electronic device holder may include a further mounting element for tiltably mounting the planar support to the passenger seat.

In various embodiments, the clamping flap is made of transparent material.

Various embodiments provide an integrated entertainment system, e.g. the integrated entertainment system 1100 of FIGS. 11-13 or the integrated entertainment system 1400 of FIGS. 14-15, for a passenger seat, including a monitor mounted to a back of the passenger seat, a longitudinal clamping structure, and a mounting element for slidably or tiltably mounting the clamping structure to the monitor. The clamping structure may have a generally L-shaped cross-section, and is configured to hold the portable electronic device between the clamping structure and the planar support. The clamping structure may include a supporting flap forming an L-base of the generally L-shaped clamping structure and configured to support the portable electronic device, and a clamping flap forming an L-leg of the generally L-shaped clamping structure and configured to clamp the portable electronic device against the planar support.

In various embodiments, the clamping structure is mounted to the monitor slidably in a direction at least substantially perpendicular to a surface of monitor to adjust a space between the clamping flap and the monitor.

In various embodiments, the clamping flap is pivotably coupled to the supporting flap through a hinge. In various embodiments, the clamping flap is pivotable to adjust a space between the clamping flap and the monitor.

In various embodiments, the clamping structure includes a biasing element configured to urge the clamping flap towards the supporting flap, thereby exerting a force to clamp the portable electronic device against the monitor.

In various embodiments, the mounting element may be integrally formed together with the supporting flap of the clamping structure. In other embodiments, the mounting element may be connected to the clamping structure, e.g. the mounting element may be separate pieces which is joined or connected to the clamping structure.

In various embodiments, the integrated entertainment system may include a further mounting element for tiltably mounting the monitor to the passenger seat.

In various embodiments, the clamping flap is made of transparent material.

The various embodiments described above with regard to FIGS. 4-15 may be combined, to provide a PED holder/integrated entertainment system slidable in the translation direction perpendicular to the back of the passenger seat to adjust the space between the clamping flap and the surface abutting the PED, a PED holder/integrated entertainment system having a clamping structure with one flap pivotable coupled to the another flap to adjust the space between the clamping flap and the surface abutting the PED, a PED holder/integrated entertainment system both slidable in the translation direction and pivotable to adjust the space between the clamping flap and the surface abutting the PED, a PED holder/integrated entertainment system tiltably mounted to a passenger seat to adjust the viewing angle of the PED, and a combination thereof.

Various embodiments further provide a passenger seat including a portable electronic device holder described in various embodiments of FIGS. 4-15 above mounted on the back of the seat.

Various embodiments further provide a passenger seat including an integrated entertainment system described in various embodiments of FIGS. 6-15 above mounted on the back of the seat.

According to various embodiments, the IFE system manufacturers' strengths are synergized with the growing trend of PED usage on board the plane. Airlines enable their passengers to use their PEDs independently from the tray table. In addition, airlines do not have to worry about their pouches from being taken away. The PED holder according to various embodiments takes up less space as shown in FIG. 4-15 above.

The tiltable PED holder allows the passenger to adjust the PED holder's viewing angle in order to compensate the change in viewing angle when the backrest in front of the passenger changes it recline angle. In addition, the PED holder may be placed at the upper section of the seatback, which will allow passengers to look at their PED comfortably without staining their necks. This may be achieved by utilizing the IFE mounting provisions for the planar support of the PED holder. The planar support of the PED holder may also be the IFE monitor. The PED holder of various embodiments neither interferes with passenger's use of the dining table nor is it easily carried away.

The PED holder according to various embodiments is adjustable in translational and/or rotational directions to cater for PEDs of different thickness. The PED will be sandwiched between the clamping structure and the planar support/IFE monitor screen/seat back to keep the PED in place. The clamping structure can be designed with different grip force to suit for different seat recline and targeted PEDs.

Various embodiments provide a PED holder mountable onto an aircraft seat. The PED holder may be tiltably mounted, allowing the aircraft passenger to view the PED at different angles. Various embodiments provide an integrated entertainment system combining an IFE monitor with a PED holder. The PED holder may include a base (e.g. a planar support or a monitor), an adjustable clamping structure, and a mounting provision. The base may act as a foundation support for the PED to rest on, which may be an IFE monitor or a planar support, or the seat back of the passenger seat. The adjustable clamping structure to grip the PED in place may be moved translational or rotationally, or both. In addition, the adjustable clamping structure may have a spring force that will automatically try to close the gap between the adjustable clamping structure and the base. The mounting provision may be a tiltable mounting provision used to tilt the PED holder, so that the user of the PED holder is able to adjust the viewing angle of the PED. The PED is sandwiched between the base and the adjustable clamping structure.

The adjustable clamping structure may be designed with different shape and size to suit for seat recline and targeted PED requirements. The strength of the adjustable clamping structure may also be adjusted to cater for different PEDs. The adjustable clamping structure may be made from transparent material to minimize blockage of PED effective area.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A portable electronic device holder for a passenger seat, comprising:
    a longitudinal clamping structure having a generally L-shaped cross-section, comprising:
        a supporting flap forming an L-base of the generally L-shaped clamping structure, and configured to support a portable electronic device such that an effective area of the portable electronic device is not parallel to the supporting flap,
        a clamping flap forming an L-leg of the generally L-shaped clamping structure, and configured to clamp the portable electronic device against a surface abutting the portable electronic device, and
    a mounting structure for slidably or tiltably mounting the clamping structure to the passenger seat; wherein
    the clamping flap is pivotably coupled to the supporting flap through a hinge; and wherein
    the clamping structure comprises a biasing structure configured to urge the clamping flap towards the supporting flap.

2. The portable electronic device holder according to claim 1, wherein the clamping structure is configured to be mounted to a back of the passenger seat slidably in a direction at least substantially perpendicular to a plane of the back of the seat to adjust a space between the clamping flap and the surface abutting the portable electronic device.

3. The portable electronic device holder according to claim 1, wherein the clamping structure is tiltable relative to a back of the passenger seat to adjust a viewing angle of the portable electronic device.

4. The portable electronic device holder according to claim 1, wherein the clamping flap is made of transparent material.

5. The portable electronic device holder according to claim 1, wherein the surface abutting the portable electronic device comprises one of a back of the passenger seat, a monitor, or a planar support.

6. The portable electronic device holder according to claim 1, wherein the mounting structure is integrally formed together with the supporting flap of the clamping structure.

7. The portable electronic device holder according to claim 1, wherein the mounting structure is connected to the clamping structure.

8. A portable electronic device holder for a passenger seat, comprising:
    a planar support;
    a longitudinal clamping structure attached to the planar support, the longitudinal clamping structure having a generally L-shaped cross-section and configured to hold a portable electronic device between the longitudinal clamping structure and the planar support and comprising:
        a supporting flap forming an L-base of the generally L-shaped clamping structure, and configured to support the portable electronic device such that an effective area of the portable electronic device is not parallel to the supporting flap,
        a clamping flap forming an L-leg of the generally L-shaped clamping structure, and configured to clamp the portable electronic device against the planar support, and
    a mounting structure for slidably or tiltably mounting the portable electronic device holder to the passenger seat; wherein
    the clamping flap is pivotably coupled to the supporting flap through a hinge; and wherein
    the longitudinal clamping structure comprises a biasing structure configured to urge the clamping flap towards the supporting flap.

9. The portable electronic device holder according to claim 8, wherein the mounting structure is connected to the clamping structure.

10. The portable electronic device holder according to claim 8, comprising:
    a further mounting structure for tiltably mounting the planar support to the passenger seat.

11. The portable electronic device holder according to claim 8, wherein the portable electronic device holder is configured to be mounted to a back of the passenger seat slidably in a direction at least substantially perpendicular to a plane of the back of the seat to adjust a space between the clamping flap and the planar support.

12. The portable electronic device holder according to claim 8, wherein the clamping structure is attached to the planar support slidably in a direction at least substantially perpendicular to a plane of the planar support to adjust a space between the clamping flap and the planar support.

13. The portable electronic device holder according to claim 8, wherein the clamping structure is tiltable relative to a back of the passenger seat to adjust a viewing angle of the portable electronic device.

14. An integrated entertainment system for use with a passenger seat comprising:
 a monitor mounted in a back of the passenger seat;
 a longitudinal clamping structure mounted to the monitor, the clamping structure having a generally L-shaped cross-section and configured to hold a portable electronic device between the monitor and the clamping structure, comprising:
  a supporting flap forming an L-base of the generally L-shaped clamping structure, and configured to support the portable electronic device such that an effective area of the portable electronic device is not parallel to the supporting flap,
  a clamping flap forming an L-leg of the generally L-shaped clamping structure, and configured to clamp the portable electronic device against the monitor, and
 a mounting structure for slidably or tiltably mounting the clamping structure to the monitor; wherein
 the clamping flap is pivotably coupled to the supporting flap through a hinge; and wherein
 the clamping structure comprises a biasing structure configured to urge the clamping flap towards the supporting flap.

15. The integrated entertainment system according to claim 14, wherein the clamping structure is mounted to the monitor slidably in a direction at least substantially perpendicular to a surface of the monitor to adjust a space between the clamping flap and the monitor.

16. The integrated entertainment system according to claim 14, further comprising:
 a second mounting structure for tiltably mounting the integrated entertainment system to the passenger seat.

* * * * *